United States Patent [19]

Dearth et al.

[11] Patent Number: 5,202,406
[45] Date of Patent: Apr. 13, 1993

[54] HIGH SOLIDS, CHIP RESISTANT POLYURETHANE COATING MADE FROM KETOXIME BLOCKED POLYISOCYANATE AND CYCLOHEXANE DICARBOXYLIC ACID POLYESTER

[75] Inventors: Randall S. Dearth, Lake Orion, Mich.; Richard R. Roesler, Wexford; Neil H. Nodelman, Upper St. Clair, both of Pa.; Peter D. Schmitt, Glen Dale, W. Va.

[73] Assignee: Miles Inc., Pittsburgh, Pa.

[21] Appl. No.: 816,317

[22] Filed: Dec. 30, 1991

[51] Int. Cl.$^5$ ............................................. C08G 18/80
[52] U.S. Cl. .................................................... 528/45
[58] Field of Search ........................................ 528/45

[56] References Cited

U.S. PATENT DOCUMENTS

| | | | |
|---|---|---|---|
| 4,474,934 | 10/1984 | Tanaka et al. | 528/45 |
| 4,533,684 | 8/1985 | Kordomenos et al. | 523/436 |
| 4,596,744 | 6/1986 | Anderson et al. | 428/418 |
| 4,785,068 | 11/1988 | Tominaga et al. | 528/45 |
| 4,806,585 | 2/1989 | Nakayama et al. | 524/376 |
| 4,824,925 | 4/1989 | Kamarchik, Jr. et al. | 528/45 |
| 5,028,682 | 5/1991 | Witzeman et al. | 528/45 |

*Primary Examiner*—Maurice J. Welsh
*Assistant Examiner*—Rachel Johnson
*Attorney, Agent, or Firm*—Joseph C. Gil; Aron Preis

[57] ABSTRACT

A high solids, chip resistant, sprayable polyurethane coating composition comprising the reaction mixture of a ketoxime-blocked polyisocyanate and a cyclohexanedicarboxylic acid-based polyester polyol, is disclosed. The composition is characterized by its relatively low viscosity and the resulting coating is characterized by its low volatile organic content.

15 Claims, No Drawings

HIGH SOLIDS, CHIP RESISTANT POLYURETHANE COATING MADE FROM KETOXIME BLOCKED POLYISOCYANATE AND CYCLOHEXANE DICARBOXYLIC ACID POLYESTER

FIELD OF THE INVENTION

The invention concerns an automotive chip resistant primer surfacer polyurethane coating, and more particularly to high solids coating having low volatile organic content.

SUMMARY OF THE INVENTION

A high solids, chip resistant, sprayable polyurethane coating composition comprising the reaction mixture of a ketoxime-blocked polyisocyanate and a cyclohexanedicarboxylic acid-based polyester polyol, is disclosed. The composition is characterized by its relatively low viscosity and the resulting coating is characterized by its low volatile organic content.

BACKGROUND OF THE INVENTION

Chip resistant primers-surfacers are normally applied to the lower automotive body parts, for instance rocker panels and lower door and side panels.

Coating compositions based on a blocked isocyanate component and a component containing isocyanate-reactive hydrogens are known. The purpose of the blocking agent is to prevent the polyisocyanate from reacting with the isocyanate reactive component at ambient temperature conditions and thus allows the two components to be mixed and stored prior to use. Upon baking at an elevated temperature the blocking agent is released and the reaction commences.

Oxime blocked polyisocyanates have been disclosed in the art, see U.S. Pat. Nos. 4,474,934; 4,533,684; 4,596,744; 4,785,068; 4,806,585; and 4,824,925. The art has so far failed to recognize or suggest that the blending of the oxime-blocked polyisocyanates with the polyester of the present invention would result in low viscosity product which is characterized by its low VOC (volatile organic content). While polyesters based on 1,4-cyclohexanedicarboxylic acid have been recognized to yield systems having low viscosity, the coating prepared in accordance with the present invention exhibit an unexpected synergy. The viscosity of the product is lower than that of an otherwise identical material which was based on a diethyl-malonate-blocked isocyanate.

DETAILED DESCRIPTION OF THE INVENTION

Chip resistance in the present context is measured in accordance with SAE J 400.

The term "High solids" in the present context refers to a coating composition which contains 60 to 100% solids.

The term "sprayable" in the present context means that the coating can be applied at a viscosity of, at most, 35 seconds as measured on a #4 Ford Cup.

The polyester polyol, suitable in the context of the present invention has a functionality of 2.1 to 5, preferably 2.5 to 3.5 and a hydroxyl number of about 80 to 250 and contains the reaction product of a) a polyol component containing predominantly a diol with a complimentary amount of an alcohol having a higher valence, preferably the diol is present in an amount of 70 to 95 mole %. The suitable diols are $C_{2-36}$ diols or mixtures thereof, preferably a member selected butane diol, hexane diol, cyclohexane-dimethanol, trimethyl-pentane diol, neopentyl glycol, butyl-ethyl-propane diol, methyl-propane diol or mixtures thereof. The most preferred diol is hexane 1,6-diol. The preferred alcohol having higher valence include at least one member selected from the group consisting of trimethylpropane, glycerol and pentaerythritol, and b) a dicarboxylic acid component, which contains
(i) about 40 to 100, preferably 50 to 80 mole % of 1,4-cyclohexane dicarboxylic acid (CHDA),
(ii) about 0 to 60, preferably 20 to 50 mol % of at least one dicarboxylic acid of the formula

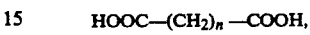

$$HOOC-(CH_2)_n-COOH,$$

where n is an integer of from 2 to 10, and
(iii) 0 to 20 mole percent of at least one cyclic dicarboxylic acid or at least one cyclic dicarboxylic acid anhydride selected from dimer acid, terephthalic acid, phthalic acid anhydride, isophthalic acid, isophthalic acid anhydride, tetrahydrophthalic acid, tetrahydrophthalic acid anhydride, hexahydrophthalic acid and hexahydrophthalic acid anhydride.

Preferably the percentages under (a) and (b) add up to 100 in each case. The special suitability of the polyester polyols according to this invention for the use according to the invention is due to the selection made according to the invention of the starting materials on which the polyester polyols are based and of the quantitative proportions in which they are used. The polyester polyols according to the invention have hydroxyl numbers within the range of about 80 to 250, preferably about 120 to 200, acid numbers below about 12, preferably about 1.0 to 10, and an average molecular weight (calculated from the stoichiometry of the starting materials used) of about 800 to 4,000, preferably about 800 to 2,000. The polyester polyols according to the invention are highly viscous, colorless to light yellow, clear resins which are soluble to form clear solutions in lacquer solvents, for example, hydrocarbons such as toluene, xylene or higher alkyl benzenes; esters such as ethyl acetate, butyl acetate, methyl glycol acetate, ethyl glycol acetate or methoxypropyl acetate; and ketones such as methyl ethyl ketone or methyl isobutyl ketone or mixtures thereof.

Preparation of the polyesters according to the invention is carried out in known manner by methods which have been fully described, for example in "Ullmanns Enzyklopadie der Technischen Chemie", Verlag Chemie Weinheim, 4th Edition (1980), Volume 19, pages 61 et seq, or by H. Wagner and H. F. Sarx in "Lackkunstharze", Carl Hanser Verlag, Munich (1971), pages 86-152. Esterification is optionally carried out in the presence of a catalytic quantity of a conventional esterification catalyst, e.g. acids, bases or transition metal compounds such as titanium tetrabutylate, at about 80° to 260° C., preferably about 100° to 200° C. The esterification reaction is continued until the desired values for the hydroxyl number and acid number are reached. The molecular weight of the polyester polyols according to the invention may be calculated from the stoichiometry of the starting materials (taking into account the resulting hydroxyl and acid numbers).

Either aromatic or aliphatic organic polyisocyanates having an average of at least 2 isocyanate groups per molecule are useful in the present context. Such polyisocyanates are described, for example in U.S. Pat. Nos. 4,065,410; 3,401,180; 3,454,606; 3,152,162; 3,492,330; 3,001,973; 3,594,164 and 3,164,605, all incorporated by reference herein.

Particularly suitable aromatic polyisocyanates include 2,4- and 2,6-toluene diisocyanate, diphenylmethane diisoyanate, p-phenylene diisocyanate, polymethylenepolyphenyl-polyisocyanate, and mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates as well as hexamethylene diisocyanate, isophorone diisocyanate, 1,4-cyclohexane diisbcyanate and the like.

In addition, prepolymers and quasi-prepolymers of the foregoing polyisocyanates having an -NCO content of about 0.5 to 30 percent by weight are useful in the context of the present invention.

The ketoxime suitable as a blocking agent in the present context conforms structurally to $$R_1C{:}NOH(R_2)_n$$

where $R_1$ denotes a $C_{1\text{-}5}$ alkylene or a cycloalkylene group, $R_2$ denotes a $C_{1\text{-}5}$ alkylene group and n is 0 or 1.

The preferred ketoxime include methylethylketoxime and methylamylketoxime.

The blocked isocyanate suitable in the preparation of the coating composition of the present invention is prepared by reactively blending a polyisocyanate with a ketoxime. At least 0.8 equivalent, preferably 0.95 to about 1.2 equivalents of ketoxime, and most preferably 1.05 equivalent of ketoxime is used per isocyanate equivalent.

The blocked polyisocyanates are formed by adding the polyisocyanate to a reactor and optionally mixing with an organic solvent. The ketoxime is added to the stirred reaction mixture at a rate that will keep the solutioh at 50–60° C. When all the ketoxime has been added, the reaction mixture is kept at 50–60° C. until there are no free isocyanate groups present, typically one hour. The ketoxime-blocked polyisocyanate is left in solution after the reaction is complete.

The suitable solvents in the present context include the known polyurethane solvents, for example toluene, xylene butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycolmonomethyl ether acetate, diethylene glycol monobutyl ether acetate, propylene glycol monomethyl ether acetate, methyl ethyl ketone and methyl isobutyl ketone, hydrocarbon solvents such as hexane and heptane, aromatic solvents and mixtures of the above.

The procedure for the preparation of the coating of the invention may be described as follows:

EXPERIMENTAL

The designations of the several compounds referred to below are as follows:

(a) polyisocyanate F refers to 4,4′-diphenylmethane diisocyanate which has been liquified by reaction in a molar ratio of about 5:1 with tripropylene glycol to give a liquid product having an NCO content of about 23% and a viscosity at 25° C. of 725 ±175 cps.

(b) solvent 1 refers to a mixture of aromatic hydrocarbon having a flash point of 100° C.

(c) polyisocyanate D refers to an isocyanurate group containing polyisocyanate, prepared from hexamethylene diisocyanate having an NCO content of 21.5%.

(d) polyisocyanate Z refers to a polyisocyanate, prepared from isophorone diisocyanate having an NCO content of 11.5%.

(e) polyisocyanate W refers to bis-(4-isocyanatocyclohexyl)-methane.

(f) polyester P refers to a polyester having a number average molecular weight of 1700, prepared from hexane diol and neopentyl glycol (molar ratio of 65/35) and adipic acid.

The following Examples are intended to illustrate the process according to the invention without limiting it in any way (percentages are by weight, unless otherwise stated).

EXAMPLE 1

Aromatic polyisocyanate/ketoxime blocks (comparative)

255.9 grams of polyisocyanate F and 75.6 grams of solvent are added to a stirred 2000 ml flask. 118.1 grams of methylethylketoxime are added dropwise at a rate that will control the temperature at 50–60° C. with mild cooling. When all the methylethylketoxime has been added the solution is kept at 50-60° C. for one hour then tested for free isocyanate content.

EXAMPLE 2

Aromatic polyisocyanate/malonate blocks (comparative)

1,723 grams of polyisocyanate F and 875 grams of propyleneglycolmonomethylether acetate are added to a stirred 5 liter flask. To this solution a mixture of 1,584.5 grams of diethylmalonate and 11.1 grams of sodium methoxide in methanol (25%) is added. The reaction mixture is allowed to heat to 70–80° C. and is then maintained at this temperature until the isocyanate content is below 1%. At this point 220.7 grams of isobutanol are added and the temperature kept at 70–80° C. until the isocyanate content is below 0.2%.

EXAMPLE 3

Aliphatic polyisocyanate/malonate blocks (comparative)

324.8 grams of polyisocyanate D, 141.8 grams of polyisocyanate Z, and 104.4 grams of solvent 1 are added to a stirred 2 liter flask and heated to 40° C. Once this solution is homogeneous a mixture of 5.7 grams of sodium methoxide in methanol (25%) and 18.5 grams of diethylmalonate is added followed by 186.9 grams of diethyl malonate, 111.3 grams of ethylacetoacetate, and 7.8 grams of 2-ethyl-1,3-hexanediol. This reaction mixture is allowed to exotherm to 70–80° C. then it is maintained at that temperature until the isocyanate content is below 0.2%. At this point 104.4 grams of butyl acetate is added.

EXAMPLE 4

Aliphatic polyisocyanate/ketoxime blocks 289 grams of polyisocyanate D, 127.5 grams of polyisocyanate Z, 94 grams of solvent 1, and 7 grams of 2-ethyl-1,3-hexanediol are added to a stirred one liter flask. To this solution 164 grams of methylethylethylketoxime are added dropwise at a rate that maintains the reaction temperature at 50-60° C. When all the methylethylketoxime is added the material is kept at this temperature until the free isocyanate content is below 0.2%. Next 51 grams of butylacetate is stirred in.

EXAMPLE 5

Ketoxime blocked polyisocyanate 384 grams of polyisocyanate D and ]86.7 grams of solvent 1 are added to a stirred 1000 ml. flask. 176.1 grams of methylethylketoxime are added dropwise at a rate that will control the temperature at 50-60° C. with mild cooling. When all the methylethylketoxime has been added the solution is kept at 50-60° C. for one hour then tested for free isocyanate content.

EXAMPLE 6

Ketoxime blocked polyisocyanate 356 grams of polyisocyanate W, 170 grams of polyester P, 29 grams of 2,2,4-Trimethylpentanediol, and 125 grams of Aromatic 100 are added to a stirred 2 liter flask. 0.25 grams of dibutyltindilaurate are added and the solution is heated to 90-100° C. and kept there until the isocyanate content is less than 13.2%. At this point 125 grams of propyleneglycolmonomethylether acetate is added and the material is cooled below 50° C. 195 grams of methylethylketoxime are then added at a rate that will maintain the temperature at 50-60° C. with mild cooling. When all the methylethylketoxime is added the material is kept at this temperature until the free isocyanate content is below 0.2%. Then the material is ready to be blended with a polyester.

EXAMPLE 1P

The preparation of a suitable polyester 294 grams of 1,4-cyclohexanedicarboxylic acid, 90 grams of trimethylolpropane, 50 grams of phthalic anhydride, 95.6 grams of adipic acid, 335.9 grams of 1,6-hexanediol, and 0.004 grams of stannous chloride are added to a stirred flask equipped with a packed column suitable for polycondensation reactions. This material is heated at 215° C. and water is removed by vacuum until the acid number is less than 1. At this point the material is cooled to 80° C. and 112 grams of butylacetate is added. Once homogenous this material is cooled and ready to be blended with blocked polyisocyanates.

EXAMPLE 2P

The preparation of a polyester outside the scope of the invention 250.5 grams of isophthalic acid, 80.0 grams of trimethylolpropane, 45 grams of phthalic anhydride, 88.2 grams of adipic acid, 247.8 grams of 1,6-hexanediol, and 0.004 grams of stannous chloride are added to a stirred flask equipped with a packed column suitable for polycondensation reactions. This material is heated at 215° C. and water is removed by vacuum until the acid number is less than 2. At this point the material is cooled to 80° C and 187.5 grams of butylacetate is added. Once homogenous this material is cooled and ready to be blended with block polyisocyanates.

| Example | Polyisocyanate of example: | Polyester | VOC[1] | Gravelometer rating |
|---|---|---|---|---|
| 1 | #2 | 2p | 3.92 | 6+ |
| 2 | #2 | 1p | 3.96 | 7 |
| 3 | #1 | 2p | 3.81 | 7 |
| 4 | #1 | 1p | 3.60 | 7 |
| 5 | #3 | 2p | 3.86 | — |
| 6 | #3 | 1p | 3.72 | — |
| 7 | #4 | 2p | 3.73 | — |
| 8 | #4 | 1p | 3.60 | — |
| 9 | #5 | 2p | 3.75 | 6+ |
| 10 | #5 | 1p | 3.28 | 8 |
| 11 | #6 | 2p | 3.70 | 7 |
| 12 | #6 | 1p | 3.50 | 8 |

[1] VOC denotes volatile organic content.

The data demonstrates that the coating prepared in accordance with the invention, represented by examples 4, 8, 10 and 12 have the lowest VOC values.

Several of the coatings which were described above were evaluated in terms of their chip resistance. Accordingly, the gravelometer ratings were as follows:

The data show that the coatings produced in accordance with the invention exhibit both low volatile organic content and high rating of chip resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A high solids, chip resistant, sprayable polyurethane coating composition comprising the reaction mixture of a ketoxime-blocked polyisocyanate and a polyester polyol, said polyol being characterized in that it has a functionality of 2.1 to 5 and a hydroxyl number of about 80 to 250 and in that it contains the reaction product of
   (a) a polyol component
   (b) a dicarboxylic acid component,
wherein said polyol component contains predominantly a diol and a complementary amount of an alcohol having a higher functionality and wherein said dicarboxylic acid component contains
   (i) about 40 to 100 mole % of 1,4-cyclohexane dicarboxylic acid (CHDA),
   (ii) about 0 to 60 mole % of at least one dicarboxylic acid of the formula

   $$HOOC-(CH_2)_n-COOH$$

where n is an integer of from 2 to 10, and
   (iii) 0 to 20 mole percent of at least one cyclic dicarboxylic acid or at least one cyclic dicarboxylic acid anhydride selected from the group consisting of dimer acid, terephthalic acid, phthalic acid anhydride, isophthalic acid, isophthalic acid anhydride, tetrahydrophthalic acid, tetrahydrophthalic acid anhydride, hexahydrophthalic acid and hexahydrophthalic acid anhydride.

2. The coating composition of claim 1 wherein said polyisocyanate is aliphatic.

3. The coating composition of claim 1 wherein said ketoxime is methylethylketoxime.

4. The coating composition of claim 2 wherein said ketoxime is methylethylketoxime.

5. The coating composition of claim 1 wherein said hydroxyl number is about 120 to 200.

6. The coating composition of claim 1 wherein said functionality is 2.5 to 3.5.

7. The coating composition of claim 1 wherein said diol is present in an amount of 70 to 95 mole %.

8. The coating composition of claim 1 wherein diol is at least one member selected from the group consisting of $C_{2-36}$ diols.

9. The coating composition of claim 1 wherein said diol is at least one member selected from the group consisting of butane diol, hexane diol, cyclohexanedimethanol, trimethyl-pentane diol, neopentyl glycol, butyl-ethyl-propane diol and methyl-propane diol.

10. The coating composition of claim 1 wherein said diol is hexane 1,6-diol.

11. The coating composition of claim 1 wherein said alcohol having a higher functionality is at least one member selected from the group consisting of trimethylalpropane, glycerol and pentaerythritol.

12. The coating composition of claim 1 wherein said polyisocyanate is aromatic.

13. The coating composition of claim 12 wherein said ketoxime is methylethylketoxime.

14. The coating composition of claim 1 wherein said ketoxime is methylamylketoxime.

15. The coating composition of claim 12 wherein said ketoxime is methylamylketoxime.

* * * * *